(12) United States Patent
Malik et al.

(10) Patent No.: US 8,928,918 B2
(45) Date of Patent: Jan. 6, 2015

(54) METHOD AND APPARATUS FOR UPLOADING A REJECTED PRINT JOB REQUEST TO AN ALTERNATIVE LOCATION

(71) Applicant: Xerox Corporation, Norwalk, CT (US)

(72) Inventors: Bijender Singh Malik, Webster, NY (US); Diane M. Olivo, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/749,386

(22) Filed: Jan. 24, 2013

(65) Prior Publication Data
US 2014/0204404 A1 Jul. 24, 2014

(51) Int. Cl.
*G06F 3/12* (2006.01)
*G06F 15/00* (2006.01)
*G06K 15/00* (2006.01)

(52) U.S. Cl.
CPC ................................. *G06K 15/408* (2013.01)
USPC .......... 358/1.15; 358/1.9; 358/1.14; 358/1.16

(58) Field of Classification Search
CPC ..... G06F 3/1288; G06F 3/126; G06F 3/1285; G06F 3/12
See application file for complete search history.

(56) References Cited

U.S. PATENT DOCUMENTS

2009/0273808 A1* 11/2009 Kohli et al. .................. 358/1.15
2010/0029326 A1* 2/2010 Bergstrom et al. ........ 455/556.1

* cited by examiner

*Primary Examiner* — Thomas Lett

(57) ABSTRACT

A method, non-transitory computer readable medium, and apparatus for uploading a rejected print job request to an alternative location are disclosed. For example, the method receives a print job request in a managed print environment, determines that the print job request violates a rule for printing in the managed print environment, displays a print job pop-up dialogue that indicates that the print job request has been rejected, wherein the print job pop-up dialogue provides one or more alternative locations to upload the print job request, receives a selection of one of the one or more alternative locations to upload the print job request, converts the print job request into an electronic document and uploads the electronic document to the one of the one or more alternative locations that was selected.

12 Claims, 5 Drawing Sheets

METHOD AND APPARATUS FOR UPLOADING A REJECTED PRINT JOB REQUEST TO AN ALTERNATIVE LOCATION

The present disclosure relates generally to managing print job requests in a managed print environment and, more particularly, to a method and an apparatus for uploading a rejected print job to an alternative location.

BACKGROUND

In a managed print environment, some documents may be rejected due to a violation of a print rule. Currently, if the print job request is rejected, the user has no alternative options at the time of the print job request to get a soft copy or a hard copy of the printed document.

The user may try and wait to print out a document when the user arrives home on his or her personal computer and printer. However, some documents may only be available for a fixed time period. As a result, if the user is unable to print the document at the time of the print job request, the document may be lost forever if the user waits until the user arrives home to print the document.

SUMMARY

According to aspects illustrated herein, there are provided a method, a non-transitory computer readable medium, and an apparatus for uploading a rejected print job request to an alternative location. One disclosed feature of the embodiments is a method that receives a print job request in a managed print environment, determines that the print job request violates a rule for printing in the managed print environment, displays a print job pop-up dialogue that indicates that the print job request has been rejected, wherein the print job pop-up dialogue provides one or more alternative locations to upload the print job request, receives a selection of one of the one or more alternative locations to upload the print job request, converts the print job request into an electronic document and uploads the electronic document to the one of the one or more alternative locations that was selected.

Another disclosed feature of the embodiments is a non-transitory computer-readable medium having stored thereon a plurality of instructions, the plurality of instructions including instructions which, when executed by a processor, cause the processor to perform a method that receives a print job request in a managed print environment, determines that the print job request violates a rule for printing in the managed print environment, displays a print job pop-up dialogue that indicates that the print job request has been rejected, wherein the print job pop-up dialogue provides one or more alternative locations to upload the print job request, receives a selection of one of the one or more alternative locations to upload the print job request, converts the print job request into an electronic document and uploads the electronic document to the one of the one or more alternative locations that was selected.

Another disclosed feature of the embodiments is an apparatus comprising a processor that is configured to receive a print job request in a managed print environment, determine that the print job request violates a rule for printing in the managed print environment, display a print job pop-up dialogue that indicates that the print job request has been rejected, wherein the print job pop-up dialogue provides one or more alternative locations to upload the print job request, receive a selection of one of the one or more alternative locations to upload the print job request, convert the print job request into an electronic document and upload the electronic document to the one of the one or more alternative locations that was selected.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory computer readable medium and apparatus for uploading a rejected print job to an alternative location. As discussed above, if a user sends a print job request in a managed print environment to print a document and the print job request is rejected, the user may have no alternative options at the time of the print job request. In addition, due to the nature of some documents, the document in the print job request may only be available for a fixed time period. As a result, if the user is unable to print the document at the time of the print job request, the document may be lost forever.

One embodiment of the present disclosure resolves this problem by providing an ability to upload a rejected print job in a managed print environment to an alternative location. For example, the user may want to print a dynamic electronic document (e.g., a time dependent or time limited electronic document) that may be constantly changing or only be available temporarily (e.g., a front page news story, a coupon, an online offer, a temporary screenshot, and the like). However, a print job request to print the dynamic electronic document may violate one or more print governance rules of the managed print environment.

Currently, the user would be at risk of losing the dynamic electronic document. However, one embodiment of the present disclosure provides an option to upload the print job request to an alternative location (e.g., a personal website, a social networking website, an email, and the like). As a result, the user may still retain a copy of the dynamic electronic document and attempt to print the dynamic electronic document at a later time by retrieving the dynamic electronic document from the alternative location that the user has selected.

Figure 1:
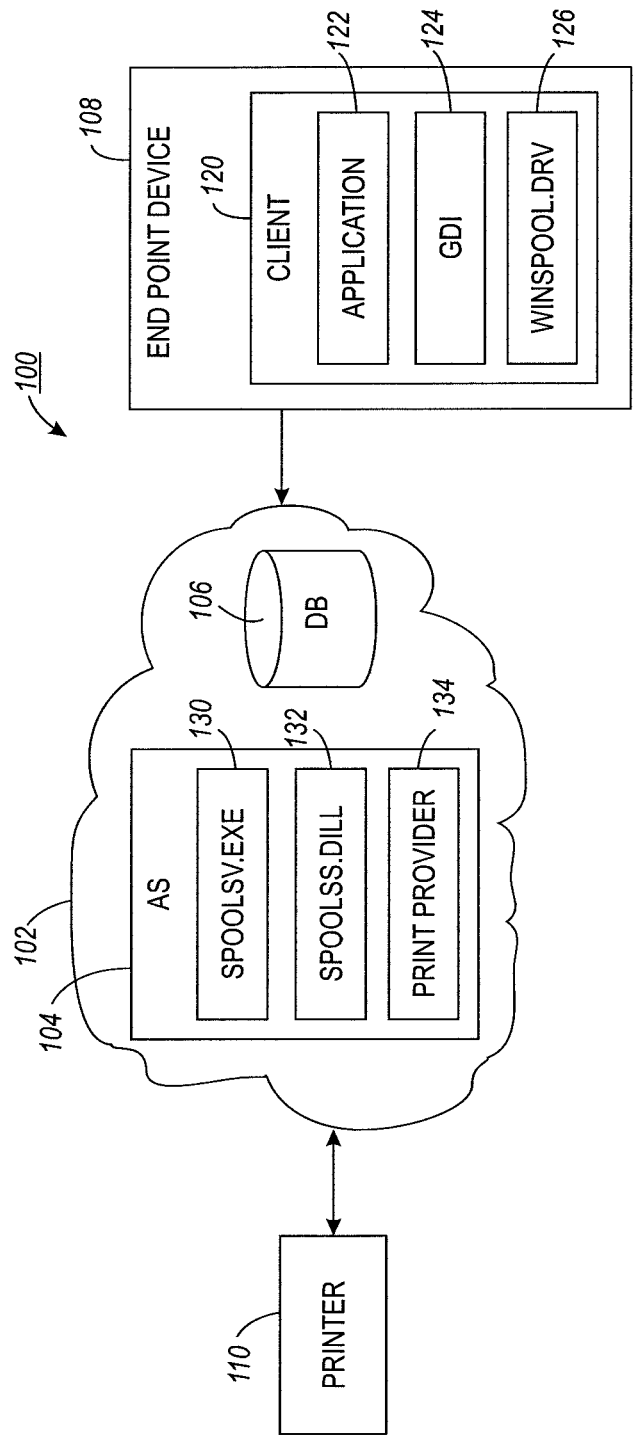
FIG. 1 illustrates one example of a communication network of the present disclosure.

To better understand the present disclosure, FIG. 1 illustrates an example of a communication network 100. In one embodiment, the communication network 100 includes a packet network such as an Internet Protocol (IP) network 102. The IP network 102 may be, for example, the Internet, a service provider network, an access network, a core network, a local area network, and the like.

In one embodiment, the IP network 102 may include an application server (AS) 104 and a database (DB) 106. In one embodiment, the AS 104 may host an application for executing a managed print environment. In one embodiment, the AS 104 may be located at an enterprise location or located remotely from the enterprise location. In one embodiment, the DB 106 may be used to store profile information, print governance rules used by the managed print environment, configuration information, and the like. Although only a single AS 104 and a single DB 106 are illustrated in FIG. 1, it should be noted that any number of application servers and/or databases may be deployed.

Although the AS 104 and the DB 106 are illustrated as being in the IP network 102, it should be noted that the AS 104 and DB 106 could be located at a third party location outside of the IP network 102. For example, the AS 104 and DB 106 may be at an enterprise location that is in communication with the IP network 102.

In one embodiment, a printer 110 and an end point device 108 may be in communication with the IP network 102. In one embodiment, the printer 110 may include general personal computing capabilities similar to the general computing device described below and illustrated in FIG. 5. In one embodiment, the printer 110 may be a multi-function device (MFD) that includes at least two different functions including, for example, digital image processing capability, electronic communication capability (e.g., email transmission, electronic file transmission, and the like), scanning capability, faxing capability, copying capability, printing capability, interfacing capability with a user via a graphical user interface with or without a touch screen, one or more input and output devices, and the like.

In one embodiment, the end point device 108 may be any device capable of communicating with the IP network 102. For example, the end point device 108 may be a desktop computer, a laptop computer, a mobile endpoint device, a smart phone, a tablet computer, a netbook computer, and the like.

In one embodiment, the AS 104 and the end point device 108 may include print spooler components. For example, the endpoint device 108 my run a client 120 that includes an application 122, a graphics device interface (GDI) 124 and a driver, e.g., Winspool.dry driver 126. In one embodiment, the application 122 creates a print job by calling the GDI 124 functions. In one embodiment, the GDI 124 includes a user-mode component and a kernel-mode component. The user-mode component may be used by Win32 applications that require graphics support. The kernel-mode component may include a graphics engine, and exports services and functions that graphics device drivers can use. In one embodiment the Winspool.dry driver 126 may be the client interface to the spooler in the AS 104.

The AS 104 may include one or more functions including a spoolsv.exe 130, a spoolss.dll 132 and one or more print providers 134. In one embodiment, the spoolsv.exe 130 is the spooler's application programming interface (API) server. It may be implemented as a service when the operating system on the endpoint device 108 is started. In one embodiment, the spoolss.dll 132 may act as a router determining which print provider 134 to call based on a printer name or handle supplied with each function call. It then passes the function call to the correct print provider 134.

In one embodiment, a user may send a print job request via his or her end point device 108 to the printer 110 in a managed print environment. In one embodiment, the print job request may be any type of document, a web page, an image, a screenshot of a video, and the like. In one embodiment, the print job request may be a dynamic electronic document that may be only available temporarily (e.g., a front page news story, a coupon, an online offer, a temporary screenshot, and the like). However, due to one or more print governance rules, the print job request may be rejected. Consequently, if the user is unable to print the dynamic electronic document, the opportunity to print the dynamic electronic document may be lost. One embodiment of the present disclosure provides a solution to this problem by providing one or more alternative locations to upload the print job until the dynamic electronic document may be printed at a later time.

Figure 2:
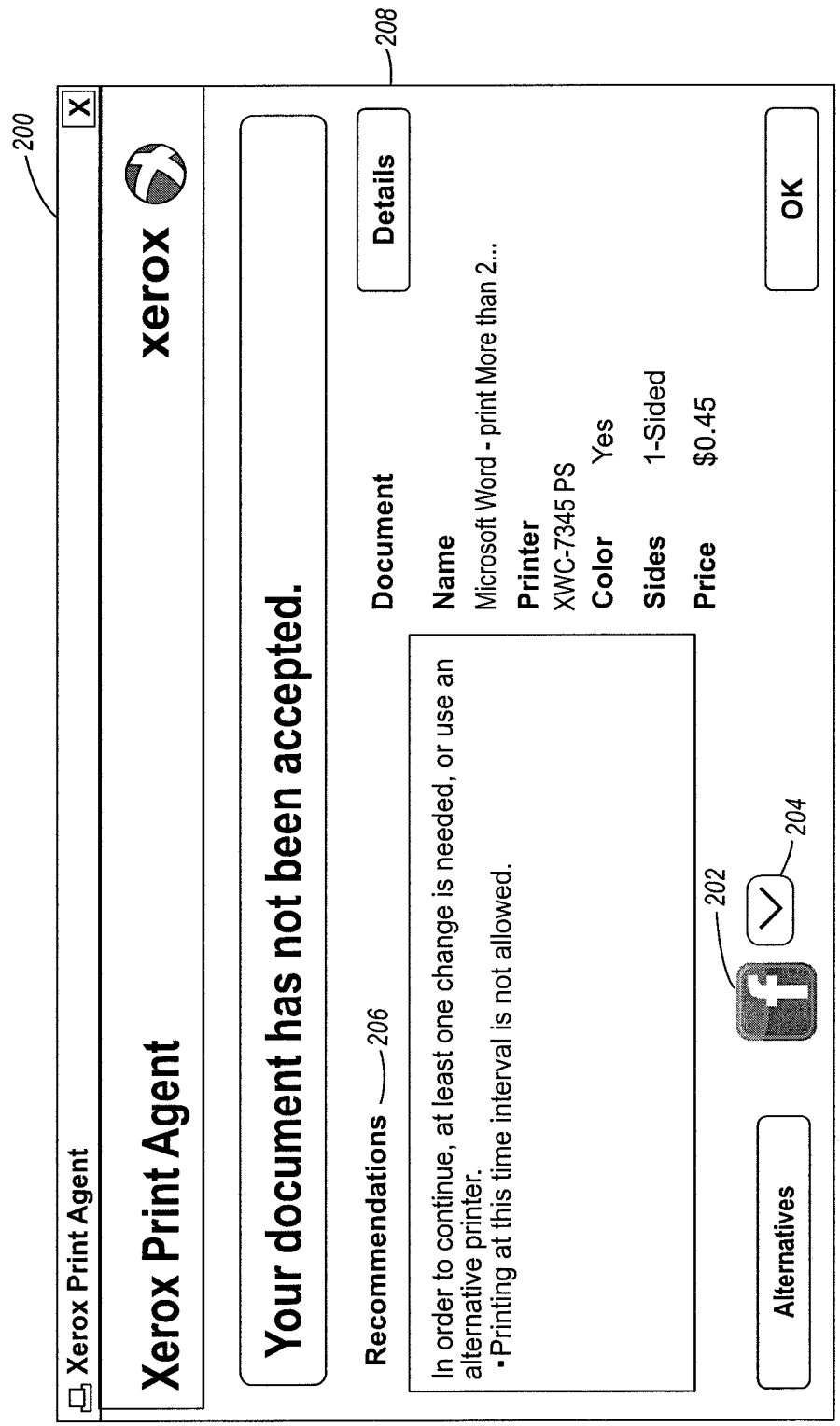
FIG. 2 illustrates a first example of print job pop-up dialogue.

FIG. 2 illustrates one example of a print job pop-up dialogue 200 that may be presented to the user if a print job request is rejected in the managed print environment. The pop-up dialogue 200 may include a recommendations box 206, a document details section 208 and one or more alternative locations 202 and 204 to upload the print job request in order to store an electronic copy of the document that is to be printed.

In the present example, the print job request violates one or more print governance rules as indicated in a recommendations box 206. Previously, the user would be unable to print the document. If the document was a dynamic electronic document, the opportunity to print may be lost forever and the document would be lost.

However, one embodiment of the present disclosure provides one or more alternative locations 202 and 204 to upload the print job request until the document can be printed, e.g., at a later time. Although only two alternative locations 202 and 204 are illustrated in FIG. 2, it should be noted that any number of alternative locations may be displayed.

In one embodiment, if the print job request is rejected, the user may select an alternative location 202 or 204. In one embodiment, the user may select multiple alternative locations 202 and 204. For example, the user may select one or more icons associated with each one of the one or more alternative locations 202 or 204. The alternative locations may include a social network website (e.g., Facebook®, Twitter®, Pintrest®, and the like), an email, and the like.

In one embodiment, when a user logs into the managed print environment, the user may also provide login information for the user's social network website account and/or the user's email account. For example, the login information may include a username and a password. As a result, when one or more of the alternative locations 202 or 204 are selected, the managed print environment may automatically log the user into the respective account associated with the alternative location 202 or 204 to upload the print job request.

In another embodiment, when the user selects one or more of the alternative locations 202 or 204, the user may be prompted to enter his or her login information. For example, another pop-up dialogue may be displayed to the user to enter his or her login information.

In one embodiment, when one of the alternative locations 202 or 204 is selected, the managed print environment may convert the print job request into an electronic document. For example, the dynamic electronic document in the print job request may be converted into a portable document format (PDF). The PDF may then be uploaded to the selected alternative location 202 or 204. The user may then, at a later time (e.g., when the print governance rules can be met, on a personal printer at home, and the like), print the PDF of the dynamic electronic document.

In one embodiment, the user may select a preference for a particular alternative location 202 or 204 in his or her user profile stored in the DB 106. As a result, when the print job request is rejected by the managed print environment, one of the alternative locations 202 or 204 may be automatically selected by the managed print environment based upon the user profile without user interaction.

Figure 3:
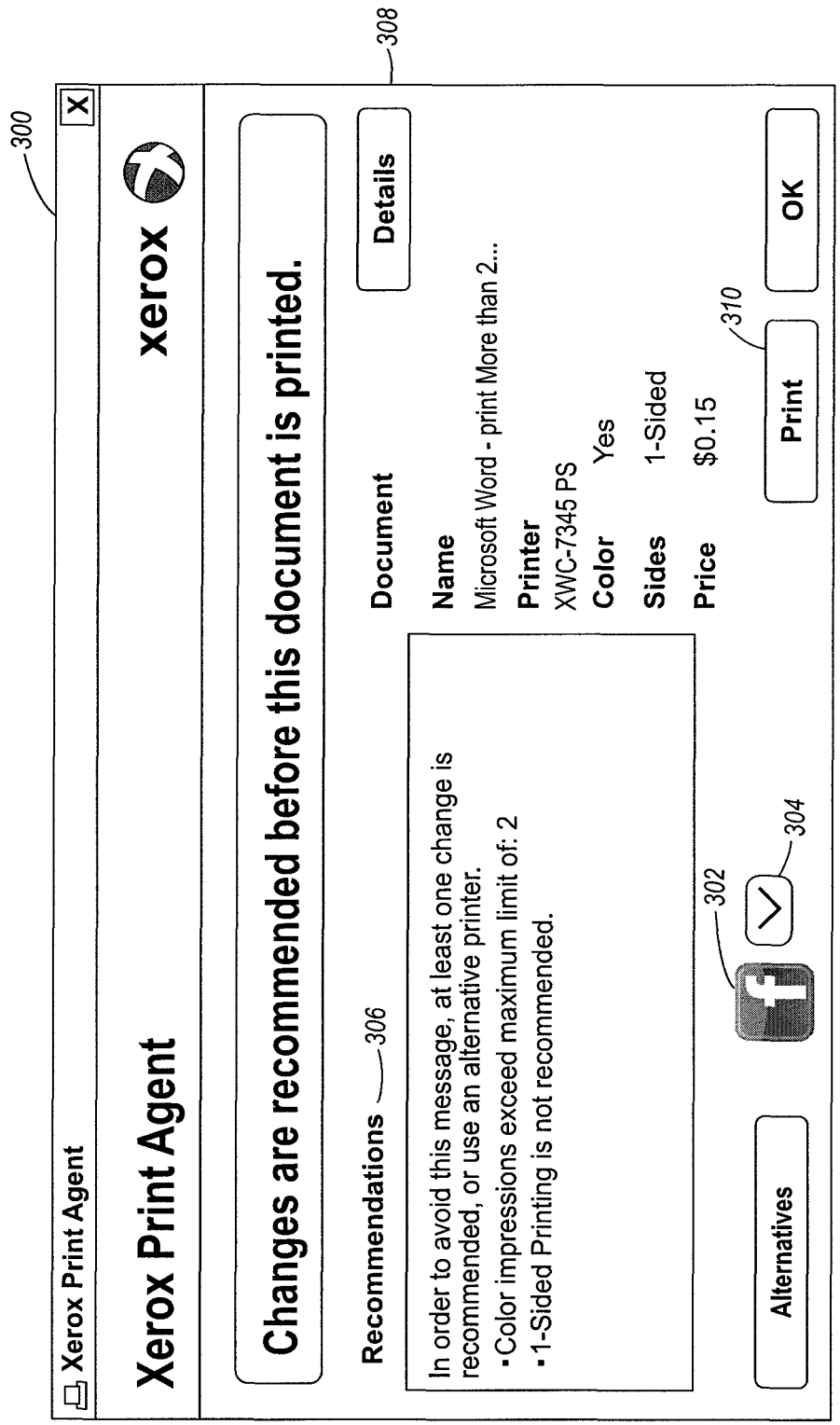
FIG. 3 illustrates a second example of a print job pop-up dialogue.

FIG. 3 illustrates an example of a confirm print job pop-up dialogue 300 that may be presented to the user when a print job has triggered a confirm rule in the managed print environment. The pop-up dialogue 300 includes a recommendations box 306, a document details section 308 and one or more alternative locations 302 and 304 to upload the print job request. Although only two alternative locations 302 and 304 are illustrated in FIG. 3, it should be noted that any number of alternative locations may be displayed.

The pop-up dialogue 300 may be presented to the user when changes are recommended to the user before printing. Thus, the pop-up dialogue 300 includes a print icon 310 to continue with the print job request, but may also provide the one or more alternative locations 302 and 304 should the user decide to complete the printing at a later time without risk of losing the dynamic electronic document.

Selecting one of the alternative locations 302 or 304 may then operate similar to how the alternative locations 202 and 204 illustrated in FIG. 2 operate, as discussed above. For example, the user may provide login information associated with the alternative locations 302 and 304 such that the user may be automatically logged in when one or more of the alternative locations 302 or 304 are selected in the pop-up dialogue 300.

In addition, when one or more of the alternative locations 302 or 304 are selected, the managed print environment may convert the print job request into an electronic document. The user may also select a preference for a particular alternative location 302 or 304 in his or her user profile stored in the DB 106. As a result, when the user decides to print at a later time, one of the alternative locations 302 or 304 may be automatically selected by the managed print environment based upon the user profile without additional user interaction.

Figure 4:
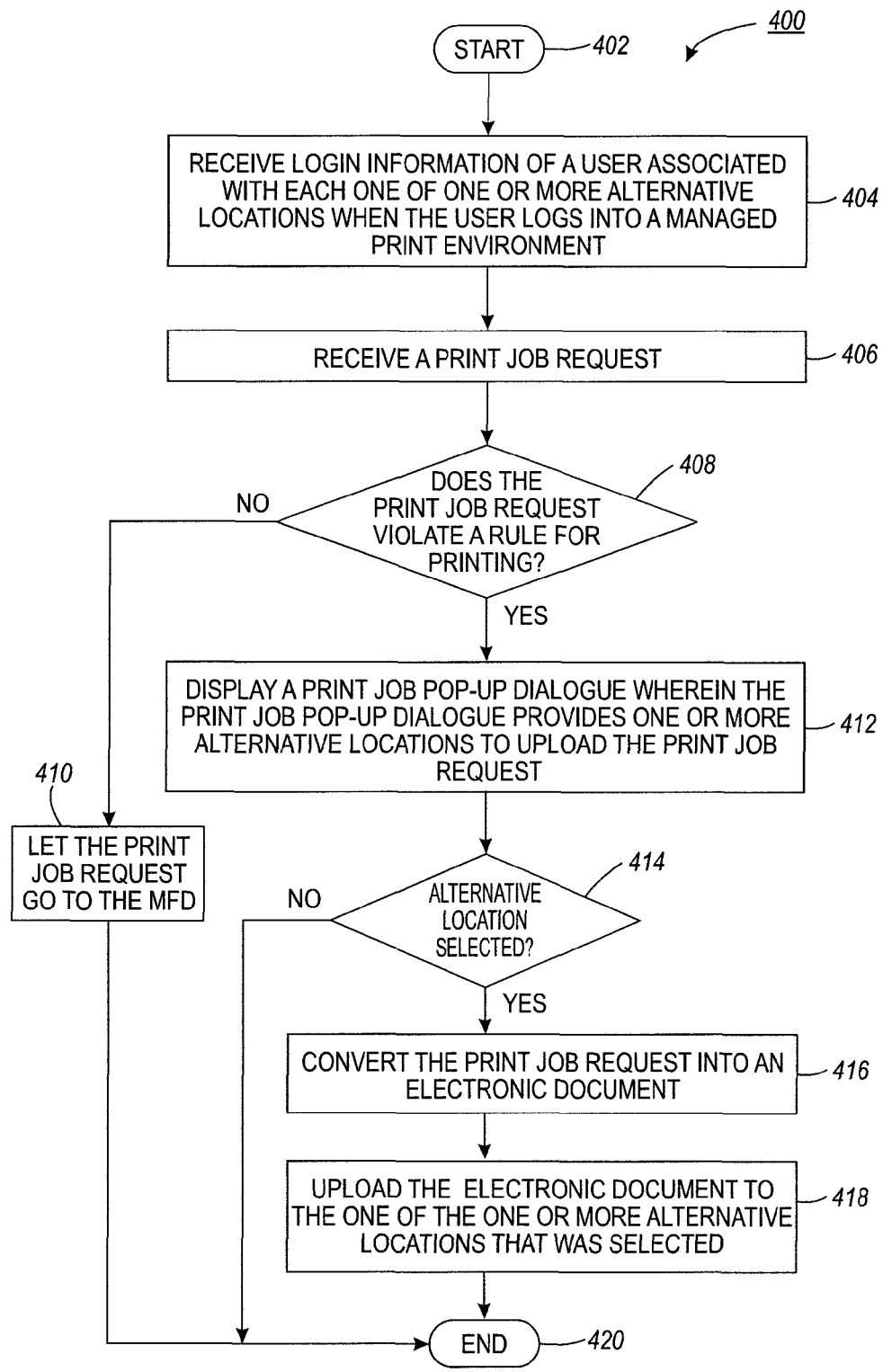
FIG. 4 illustrates an example flowchart of one embodiment of a method for uploading a rejected print job request to an alternative location.
Figure 5:
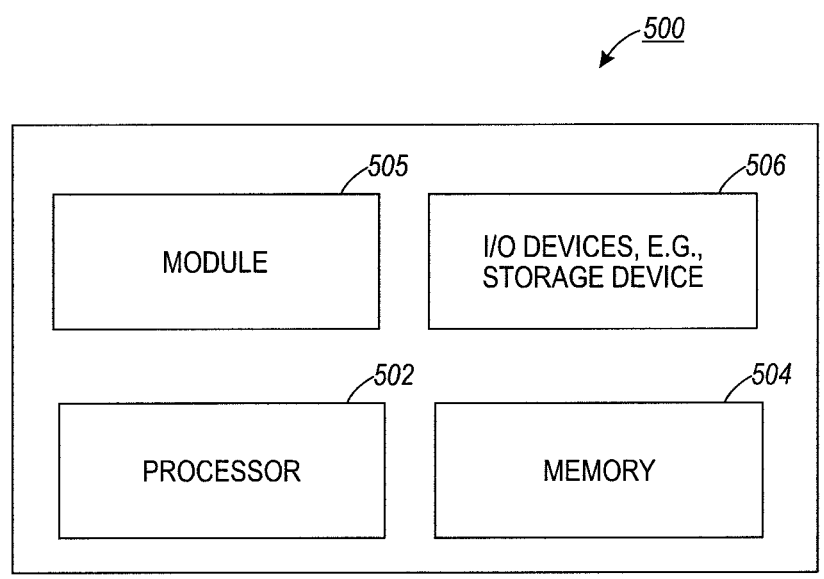
FIG. 5 illustrates a high-level block diagram of a general-purpose computer suitable for use in performing the functions described herein.

FIG. 4 illustrates a flowchart of a method 400 for uploading a rejected print job to an alternative location. In one embodiment, the method 400 may be performed by the AS 104 or a general-purpose computer as illustrated in FIG. 5 and discussed below.

The method 400 begins at step 402. The method 400 may perform optional step 402. At optional step 402, the method 400 may receive login information of a user associated with each one of one or more alternative locations when the user logs into a managed print environment. The login information may be stored in a database by the managed print environment such that the managed print environment may automatically log in the user if the user selects one of the one or more alternative locations. In another embodiment, the user may be prompted to provide his or her login information at the time the user selects one of the one or more alternative locations.

At step 406, the method 400 receives a print job request. For example, a user may send a print job request to a printer in the managed print environment. A print agent may capture a page description language (PDL) from a print spooler and hold the print job request until the print job request can be analyzed to determine if the print job request violates one or more print governance rules.

At step 408, the method 400 determines if the print job request violates a rule for printing. For example, print governance rules in a managed print environment may define when a document may be printed (e.g., non-peak hours, business hours, during a weekday, 8:00 am to 6:00 pm, and the like), what kinds of documents may be printed (e.g., text documents, documents with no images, and the like) and how the document can be printed (e.g., black and white, double sided, how many pages, which printers can be used, and the like).

If the print job request does not violate a rule for printing, the method 400 may proceed to step 410. At step 410, the method 400 lets the print job request go to the printer, e.g., a MFD. The method 400 then proceeds to step 420, where the method 400 ends.

However, if the print job request does violate a rule for printing, the method 400 proceeds to step 412. At step 412, the method 400 displays a print job pop-up dialogue, wherein the print job pop-up dialogue provides one or more alternative locations to upload the print job request. In one embodiment, the alternative locations may include a social network website (e.g., Facebook®, Twitter®, Pintrest®, and the like), an email, and the like. The alternative locations may be presented as icons on the print job pop-up dialogue that can be selected by the user.

At step 414, the method 400 determines if an alternative location is selected. If an alternative location is not selected, the method 400 proceeds to step 420 where the method 400 ends.

However, at step 414 if an alternative location is selected, the method 400 may proceed to step 416. At step 416, the method 400 may convert the print job request into an electronic document. For example, the dynamic electronic document in the print job request may be converted into a portable document format (PDF).

At step 418, the method 400 uploads the electronic document to the one of the one or more alternative locations that was selected. For example, the PDF that was created in step 416 may then be uploaded to the selected alternative location or locations. The user may then, at a later time (e.g., when the print governance rules can be met, on a personal printer at home, and the like), print the PDF of the dynamic electronic document. The method ends at step 420.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 4 that recite a determining operation, or involve a decision, do not necessarily require that both branches of the determining operation be practiced. In other words, one of the branches of the determining operation can be deemed as an optional step.

FIG. 5 depicts a high-level block diagram of a general-purpose computer suitable for use in performing the functions described herein. As depicted in FIG. 5, the system 500 comprises a hardware processor element 502 (e.g., a microprocessor, a central processing unit (CPU) and the like), a memory 504, e.g., random access memory (RAM) and/or read only memory (ROM), a module 505 for uploading a rejected print job request to an alternative location, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 505 for uploading a rejected print job request to an alternative location can be loaded into memory 504 and executed by processor 502 to implement the functions as discussed above. As such, the present method 505 for uploading a rejected print job request to an alternative location (including associated data structures) of the present disclosure can be stored on a non-transitory (e.g., physical and tangible) computer readable storage medium, e.g., RAM memory, magnetic or optical drive or diskette and the like. For example, the hardware processor 502 can be programmed or configured with instructions (e.g., computer readable instructions) to perform the steps, functions, or operations of method 400.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for uploading a rejected print job request to an alternative location, comprising:
   receiving a print job request in a managed print environment, wherein the print job request comprises a request to print a web page that is time limited;
   determining that the print job request violates a rule for printing in the managed print environment;
   displaying a print job pop-up dialogue that indicates that the print job request has been rejected, wherein the print job pop-up dialogue provides one or more alternative locations to upload the print job request, wherein the one or more alternative locations comprise a social networking site or an email;
   receiving a selection of one of the one or more alternative locations to upload the print job request;
   converting the print job request into an electronic document; and
   uploading the electronic document to the one of the one or more alternative locations that was selected.

2. The method of claim 1, wherein the converting the print job request into the electronic document comprises converting the print job request into a portable document format (PDF).

3. The method of claim 1, further comprising:
   receiving login information of a user associated with each one of the one or more alternative locations when the user logs into the managed print environment.

4. The method of claim 3, wherein the uploading comprises logging into the one of the one or more alternative locations that was selected with the login information of the user.

5. The method of claim 1, wherein the receiving the selection of the one of the one or more alternative locations to upload the print job request is selected based upon a user preference stored in a user profile.

6. A non-transitory computer-readable medium having stored thereon a plurality of instructions, the plurality of instructions including instructions which, when executed by a processor, cause the processor to perform operations for uploading a rejected print job request to an alternative location, the operations comprising:
   receiving a print job request in a managed print environment, wherein the print job request comprises a request to print a web page that is time limited;
   determining that the print job request violates a rule for printing in the managed print environment;
   displaying a print job pop-up dialogue that indicates that the print job request has been rejected, wherein the print job pop-up dialogue provides one or more alternative locations to upload the print job request, wherein the one or more alternative locations comprise a social networking site or an email;
   receiving a selection of one of the one or more alternative locations to upload the print job request;
   converting the print job request into an electronic document; and
   uploading the electronic document to the one of the one or more alternative locations that was selected.

7. The non-transitory computer-readable medium of claim 6, wherein the converting the print job request into the electronic document comprises converting the print job request into a portable document format (PDF).

8. The non-transitory computer-readable medium of claim 6, receiving login information of a user associated with each one of the one or more alternative locations when the user logs into the managed print environment.

9. The non-transitory computer-readable medium of claim 8, wherein the uploading comprises logging into the one of the one or more alternative locations that was selected with the login information of the user.

10. The non-transitory computer-readable medium of claim 6, wherein the receiving the selection of the one of the one or more alternative locations to upload the print job request is selected based upon a user preference stored in a user profile.

11. A method for uploading a rejected print job request to an alternative location, comprising:
   receiving login information of a user associated with each one of one or more alternative locations when the user logs into a managed print environment, wherein the managed print environment comprises a set of print governance rules;
   receiving a print job request from the user to print a web page that is time limited in the managed print environment;
   determining that the print job request violates a print governance rule of the set of print governance rules for printing in the managed print environment;
   displaying a print job pop-up dialogue that indicates that the print job request has been rejected, wherein the print job pop-up dialogue comprises one or more icons, wherein each one of the one or more icons is associated with a respective alternative location to upload the print job request, wherein the respective alternative location comprises a social networking site or an email;
   receiving a selection of one of the one or more icons to upload the print job request to the respective alternative location;
   converting the print job request into an electronic document; and
   uploading the electronic document to the respective alternative location that was selected by the one of the one or more icons.

12. The method of claim 11, wherein the receiving the selection of the one of the one or more icons to upload the print job request is selected based upon a user preference stored in a user profile.

* * * * *